W. A. CHIPPS.
DUAL WHEEL REMOVER.
APPLICATION FILED SEPT. 18, 1919.
1,378,582.
Patented May 17, 1921.
2 SHEETS—SHEET 1.
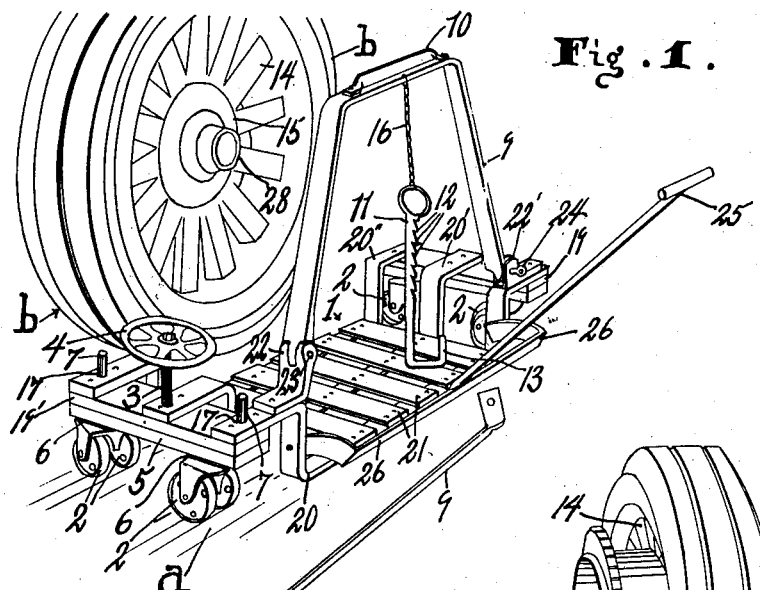
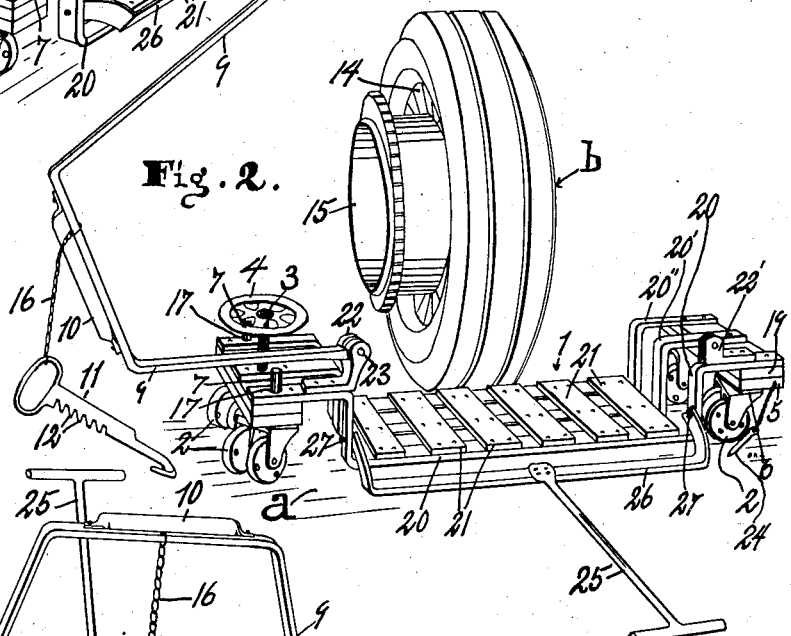
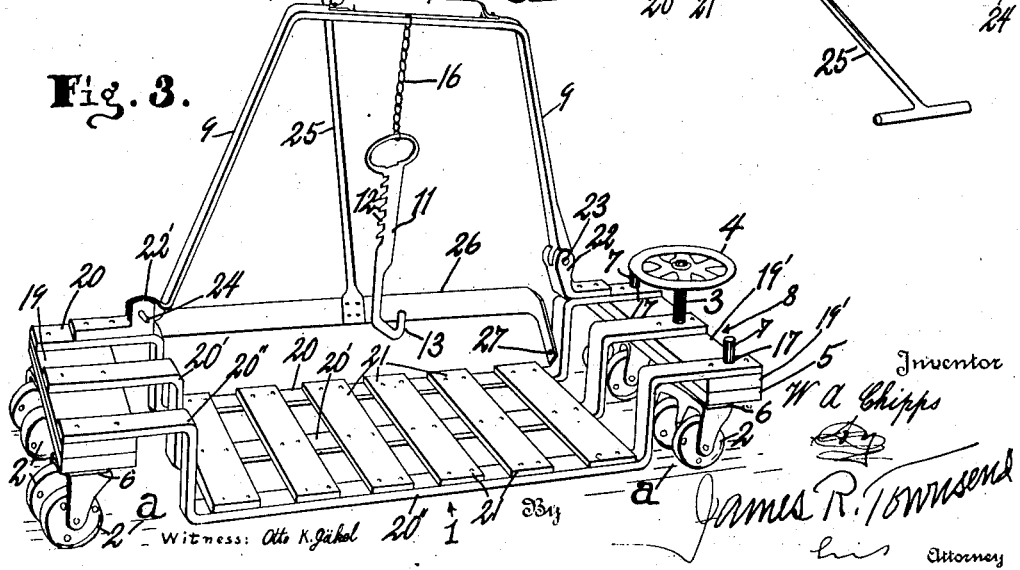

W. A. CHIPPS.
DUAL WHEEL REMOVER.
APPLICATION FILED SEPT. 18, 1919.
1,378,582.
Patented May 17, 1921.
2 SHEETS—SHEET 2.
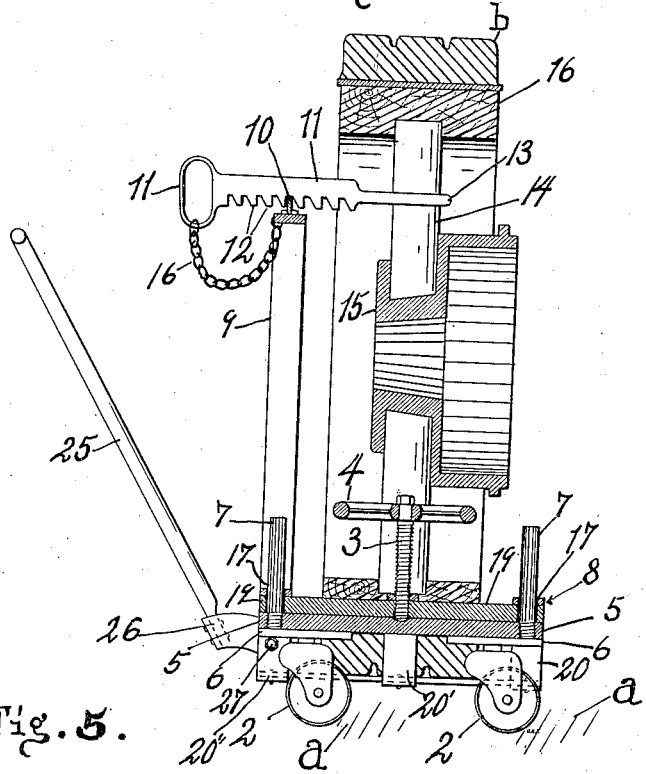
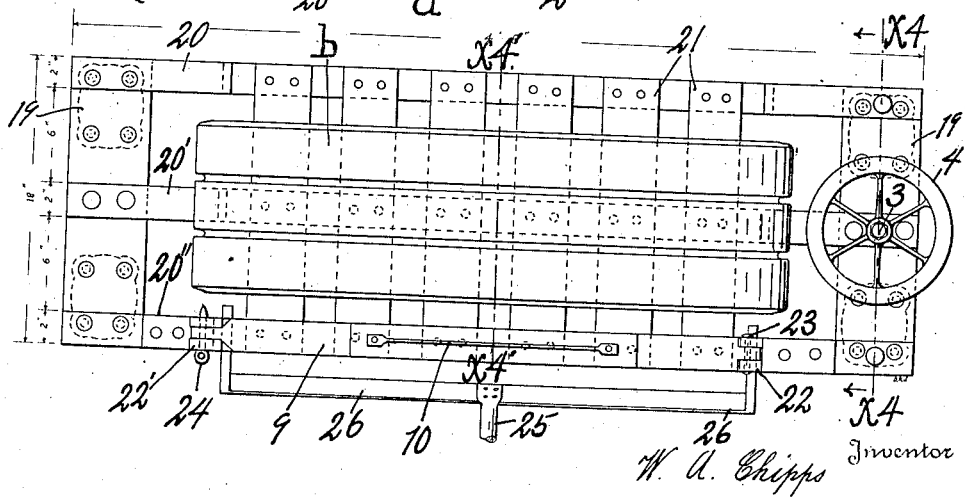
Witness: Otto K. Jäkel.
W. A. Chipps, Inventor
By James R. Townsend
his Attorney

UNITED STATES PATENT OFFICE.

WILLIAM A. CHIPPS, OF LOS ANGELES, CALIFORNIA.

DUAL-WHEEL REMOVER.

1,378,582.  Specification of Letters Patent.  Patented May 17, 1921.

Application filed September 18, 1919. Serial No. 324,692.

*To all whom it may concern:*

Be it known that I, WILLIAM ALBERT CHIPPS, a citizen of the United States, residing at Los Angeles, in the county of Los Angeles and State of California, have invented a new and useful Dual-Wheel Remover, of which the following is a specification.

An object of this invention is to provide means for placing and removing heavy wheels on and from their axles. This invention is more particularly intended for use for placing on and removing from their axles, the heavy wheels of motor trucks, and an object of this invention is to enable one man unaided and alone to easily remove, transport, support and replace such wheels with ease, facility and speed. I am not aware that any device having this object in view has heretofore been proposed.

Further objects are simplicity, cheapness and strength of construction and ease of transporting the removed wheel from place to place.

This invention comprises a carriage having a floor supported platform that is adapted to be moved into place under an elevated dual wheel and is provided with means for raising the platform to engage such wheel and lift it from the support afforded by the axle, and is easily and readily movable on the floor to remove the wheel from the axle by which it is elevated.

Another feature is a novel construction of stay to hold the wheel in upright position on the platform during the operation of removal, transportation and replacement.

The stay is movable into and out of wheel staying and supporting position and an object in this respect is to allow the wheel to be received onto and removed off of the platform in any desired position.

Other objects, advantages and features of invention may appear from the accompanying drawings, the subjoined detailed description and the appended claims.

The accompanying drawings illustrate the invention.

Figure 1 is perspective view of the invention in the form I at present deem most acceptable, in a position to be moved under an elevated axle supported wheel of a motor truck.

Fig. 2 is a perspective view of the device with parts in position to receive a motor truck wheel which is shown in position to be rolled up off of the floor onto the platform.

Fig. 3 is a perspective view from the side opposite that shown in Figs. 1 and 2.

Fig. 4 is an elevation of the device on line $x^4$, Fig. 5. The dual motor truck wheel shown in Fig. 5 is in vertical mid-section on line indicated at $x^{4\prime}$, Fig. 5.

Fig. 5 is a plan of the device with a motor truck wheel in position thereon ready for transportation and for application to an axle of a motor truck not shown.

The carriage shown comprises a platform 1, and end supports therefor including antifriction means consisting of casters 2 adapted to run freely on the floor $a$, and supporting the platform 1; and means, as the screw 3, wheel 4 and a suitable purchase or support as the bar 5, against which the screw 3 operates to raise the platform 1 through which it screws.

The purchase 5 is shown as consisting of a transverse bar supported by the antifriction means 2 which are shown as swiveled casters that turn freely with relation to their fastening plates 6 that are suitably secured to the bar 5, which in turn is provided with guide means 7 that engage one end of the platform 8 and allow it to be raised and lowered relative to the end support without disengagement therefrom.

A standard 9 having a retainer 10 with which latch bar 11 may engage is secured to the carriage to support the truck wheel $b$. The latch bar 11 is provided with truck wheel engaging means which are preferably in the form of a hook 13 to engage a spoke 14 and which connects the hub 15 with the felly of the wheel $b$.

The latch bar 11 may be attached to the standard 9 by any suitable means as a chain 16 to prevent loss.

The platform 8 is provided with guide holes 17 through which the uprights 7 extend, and screw and wheel means 3 and 4 are located approximately centrally between the uprights or guide means 7 so as to prevent binding of the uprights in the guide holes 17.

The platform may be made in any suitable way and is shown as comprising a frame formed of two head bars 19, 19′, three longitudinal straps 20, 20′ and 20″, and a floor 21 comprising slats fixed on said straps. One of the straps is provided with upwardly projecting lugs 22, 22′, in one of which one end of the standard 9 is pivoted by a horizontal pintle 23 at one side of the floor 21. The other end of the standard is adapted to be detachably attached to the other lug by a pin 24. The stay is thus secured hingedly and rigidly to the two ends of the carriage.

A handle 25 is connected to a reach 26 that is pivoted by pivots 27 to one of the floor supporting straps at one side of the carriage; and the handle extends laterally from the carriage on the same side as the standard, and centrally therefrom, so that the carriage is adapted to be readily moved side-wise to bring the standard toward the face of the wheel as indicated at Fig. 4.

When the screw 3 is operated in one direction it will lift the head bar 19 of the platform from the bar 5, the tilting movement of the platform being accommodated by the pivotal movement of the antifriction support at the other end of the platform.

In practical use to remove a wheel from an axle 28 of a truck such axle will be jacked up by customary means not shown until the wheel b is raised to an appropriate height to allow the platform 1 to be moved thereunder. Then the operator, taking hold of the handle 25, will push the appliance into position to bring the lowered platform 1 under the truck wheel. Then the operator will operate the wheel 4 of the screw 3, to raise the platform 1 into contact with the truck wheel b and to support said wheel to hold it free from the axle. The nut or other truck wheel securing means, not shown, will then be removed so that the wheel can be taken off of the axle. When this has been done the appliance can be pulled straight away from the axle in alinement therewith, and thus the truck wheel will be carried away from the axle.

To insure against tilting the wheel over, the standard 9 will be connected to the spokes 14 of the wheel. This is done readily by hooking the hook 13 over one of the spokes and then engaging the teeth 12 with the retainer 10 and making the connection tight. The stay is rigid to support the wheel against tilting side-wise in either direction.

In case it is desired to remove the wheel from the platform to the floor, this is done by releasing one end of the arched standard 9, swinging said standard out of the way and sluing the wheel around and rolling it off, as will be understood from reference to Fig. 2.

In practice when it is desired to mount a truck wheel on an axle located at any point, the appliance will be brought into the position shown in Fig. 2 with the standard swung to one side, and then the wheel may be rolled up onto the platform, whereupon it may be slued around to the longitudinal position shown in Figs. 4 and 5. Then the hand wheel 4 of the screw 3 will be operated to tilt the platform endwise sufficiently to raise the hub of the wheel to the nave of the axle.

The antifriction supports which are shown as casters at the end of the platform afford pivotal connection between the platform and the floor and this is also true with respect to the movement of the platform relative to the guides 7, so that no cramping or binding occurs.

When the hub of the wheel is brought to the proper position relative to the axle, the appliance is then pushed side-wise to bring the hub of the wheel over the spindle of the axle where it may be secured in the usual manner. Then the hand wheel 4 will be manipulated to lower the platform, and then the truck wheel may be lowered to bring it onto the floor intended to support the same.

The hinge joint at 22, 23 is laterally rigid so that the bent standard can only be moved to open and close the way across the wheel supporting frame; and the fastening 22', 24 is adapted to coöperate with the hinge to hold the standard rigidly upright to support the wheel on the frame.

The frame has the elevated end portions at 19, 19' so that the casters 2 are accommodated without raising the central frame much above the floor.

I claim.

1. A wheel remover comprising supports adapted to rest on a floor; a frame having its ends mounted on said supports in adjustable relation up and down, relative to one of said supports, and means operating upon one of said supports to raise and lower the frame relative to said support, for the purpose of lifting the wheel from and lowering it onto an axle; and means at one side of the frame to run the frame sidewise for moving the wheel from and to said axle.

2. A wheel remover comprising supports resting on and adapted to be moved about upon a floor and provided with wheel supporting means in adjustable relation up and down, relative to one of said supports and with a single wheel and screw means to move such supporting means away from or toward such support; and guide means on both sides of the wheel and screw means for guiding the supporting means in up-and-down movement; the wheel and screw means being located approximately centrally between the guide means so as to prevent binding of the guide means.

3. A wheel remover comprising a carriage adapted to be moved side-wise upon a floor and provided with a wheel supporting frame adjustably mounted on end supports; and means to move said frame toward and from one of said end supports; means to secure a wheel to said frame; and a handle at one side for moving the carriage side-wise.

4. The combination with two trucks adapted to be moved upon a floor, of a frame supported at its ends on, and in adjustable relation up and down, relative to said trucks; a handle extending side-wise between the truck ends, and means to raise one end of said frame from its truck.

5. The combination with a traveling support provided with a guide means, of a second traveling support; a frame mounted at one end on said second support and connected to the first support by said guide means; and a single wheel and screw means located approximately centrally between said guide means so as to adjust the frame up and down said guide means and with relation to said first support, and so as to prevent binding of the guide means.

6. A wheel remover comprising a frame; a standard connected to said frame at one side thereof; supports for the ends of said frame; said supports being adapted to be moved upon a floor; means for raising and lowering one end of said frame relative to its support for the purpose of lifting a wheel from an axle, means for connecting the wheel to the standard to hold said wheel upright on the frame, and a handle extending laterally from the frame, at the side having the standard thereon, for the purpose of moving the frame side-wise toward and from wheel receiving position.

7. The combination with a movable wheel supporting frame and end supports upon which said frame is mounted, of a bent standard pivoted at one end to one end of said frame and detachably fastened to the other end of the frame, and means for connecting said standard to a wheel for the purpose of holding the same upright on the frame and for the further purpose of allowing the wheel to be slued around on the frame.

8. A frame having elevated end portions and a lower intermediate portion; casters supporting the end portions and adapted to run on a floor; a handle extending laterally from the intermediate portion of the frame, and means acting between one of the end portions and its supporting caster to raise and lower the frame for the purpose of adjusting a wheel relative to an axle.

9. A wheel remover comprising a carriage having a frame and means to raise and lower the frame; and provided at one side with a handle and an arched standard; said standard being hinged at one end to one end of the carriage and detachably connected to the other end of the carriage and rigidly supported by its hinge and connection; said carriage being adapted to be moved side-wise by the handle to bring the carriage underneath an elevated wheel; and a latch bar provided with a hook to engage the spokes of the wheel and provided with notches to engage the standard.

In testimony whereof, I have hereunto set my hand at Los Angeles, California, this 6th day of September 1919.

WILLIAM A. CHIPPS.

Witness:
JAMES R. TOWNSEND.